INVENTOR.
GEORGE R. MARKOW

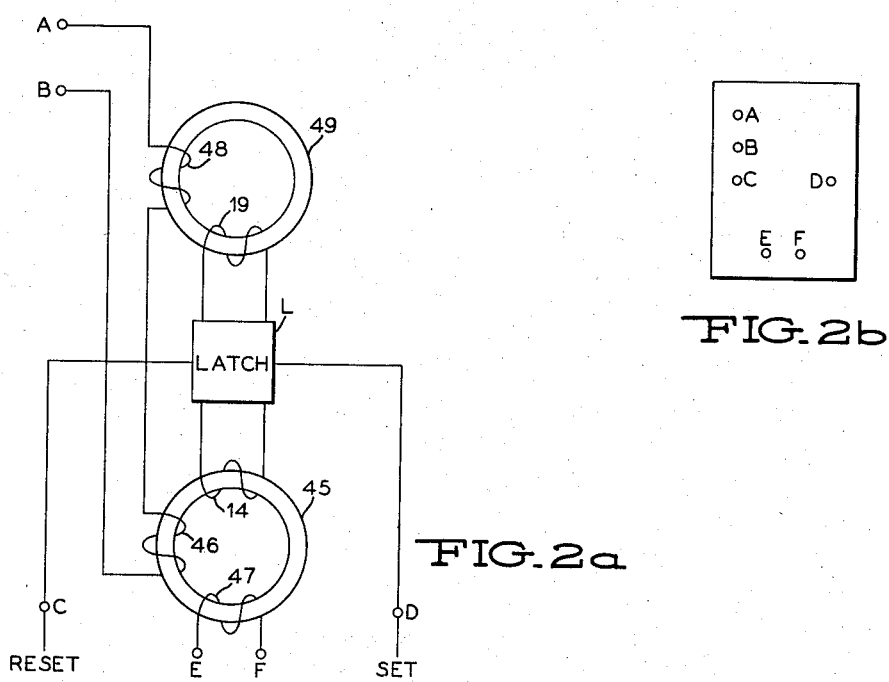
FIG. 2a
FIG. 2b
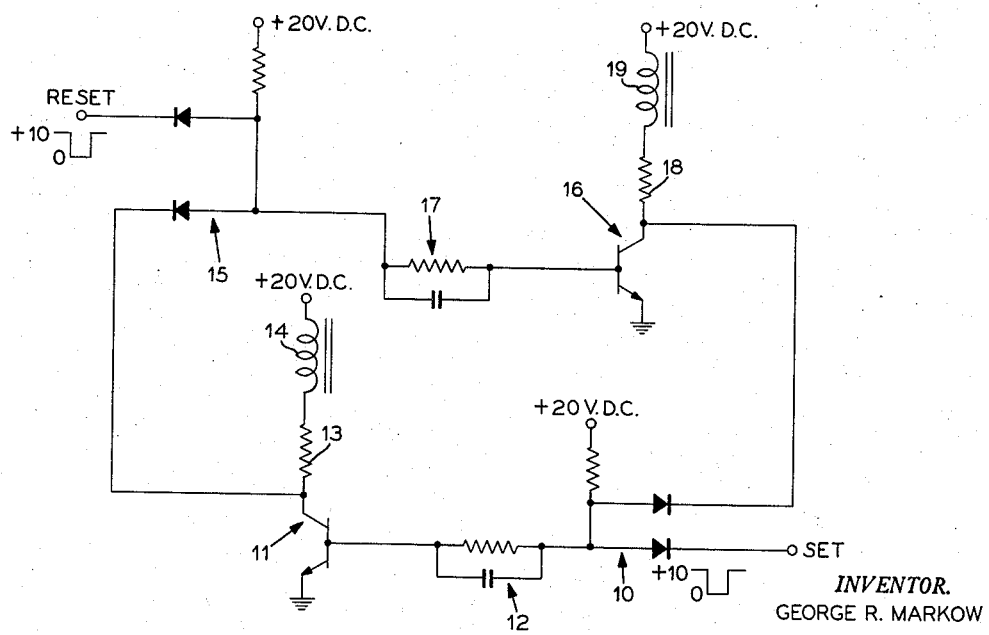
FIG. 10

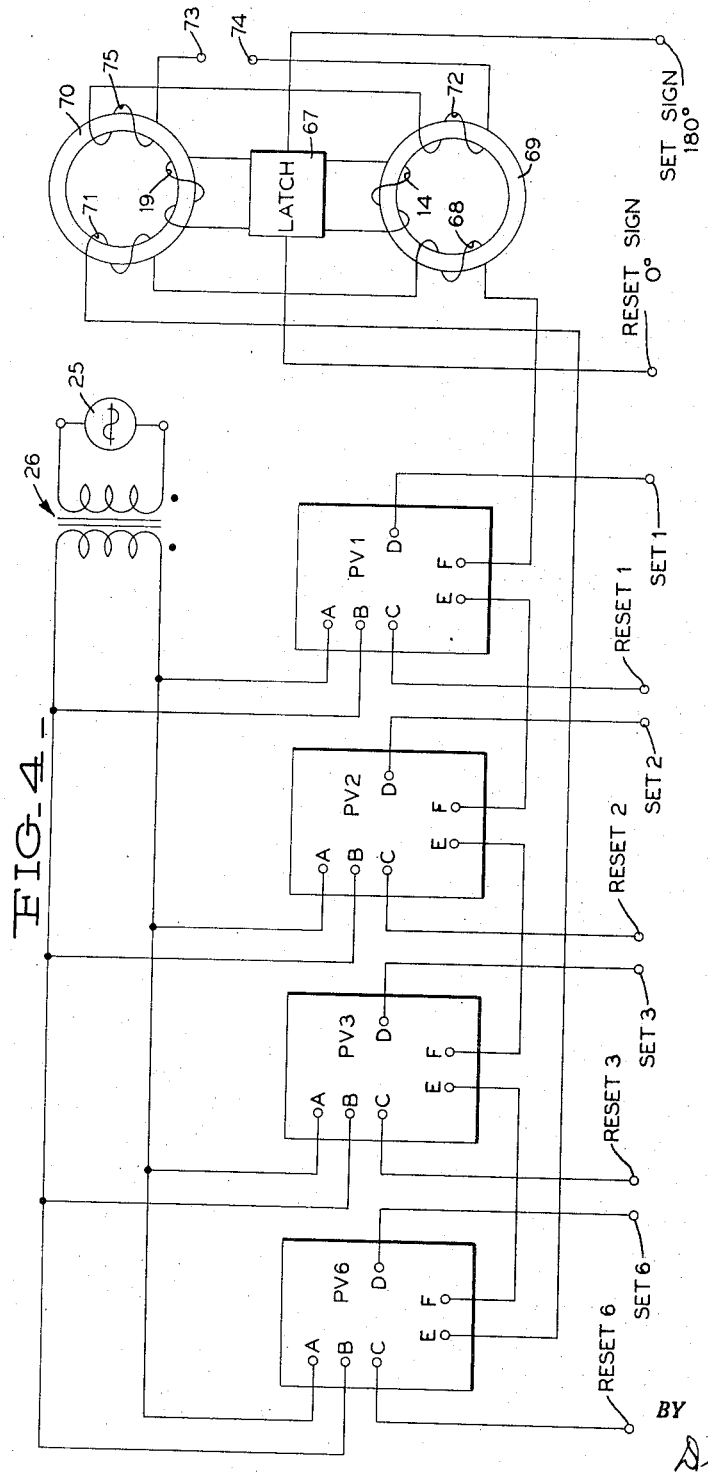

Feb. 24, 1959 G. R. MARKOW 2,875,432
SIGNAL TRANSLATING APPARATUS
Filed Dec. 30, 1955 9 Sheets-Sheet 5

INVENTOR.
GEORGE R. MARKOW
BY
Dewey J Cunningham
ATTORNEY

Feb. 24, 1959  G. R. MARKOW  2,875,432
SIGNAL TRANSLATING APPARATUS
Filed Dec. 30, 1955  9 Sheets-Sheet 6

INVENTOR.
GEORGE R. MARKOW
BY
Dewey J Cunningham
ATTORNEY

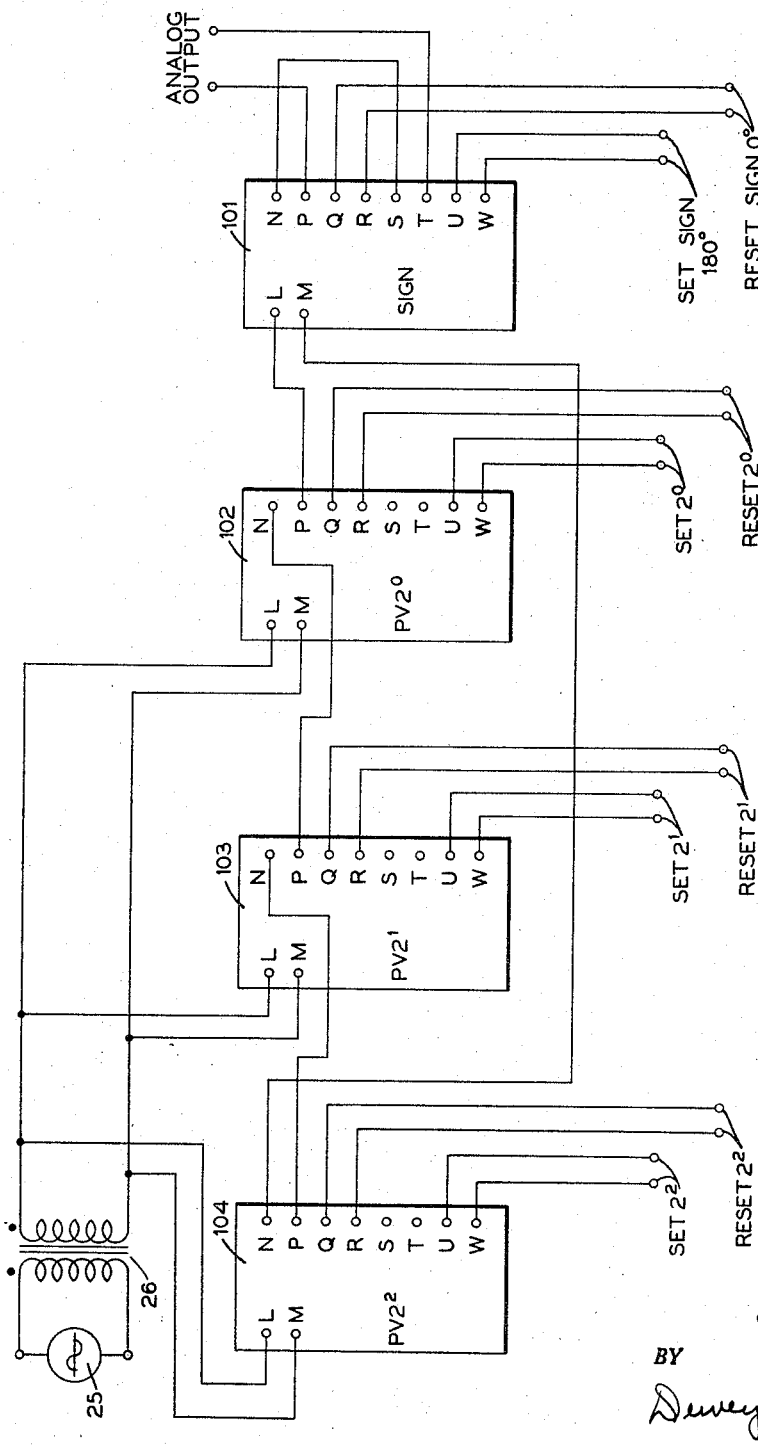

Feb. 24, 1959  G. R. MARKOW  2,875,432
SIGNAL TRANSLATING APPARATUS
Filed Dec. 30, 1955  9 Sheets—Sheet 8

INVENTOR.
GEORGE R. MARKOW
BY
Dewey J Cunningham
ATTORNEY

Feb. 24, 1959  G. R. MARKOW  2,875,432
SIGNAL TRANSLATING APPARATUS
Filed Dec. 30, 1955  9 Sheets-Sheet 9

INVENTOR.
GEORGE R. MARKOW
BY
Dewey J. Cunningham
ATTORNEY

United States Patent Office 2,875,432
Patented Feb. 24, 1959

2,875,432
SIGNAL TRANSLATING APPARATUS

George R. Markow, Endicott, N. Y., assignor to International Business Machines Corporation, New York, N. Y., a corporation of New York Application December 30, 1955, Serial No. 556,670

18 Claims. (Cl. 340—347)

This invention relates to signal translating apparatus and particularly to devices for manifesting analog information in response to a digital type of data input.

In the control field much use is made of various types of analog and digital computing devices. The analog devices offer speed in obtaining the solution to a problem whereas the digital devices can be much more accurate in the computing operation. To attempt to get both speed and accuracy, a combination of the two types of computing devices has been found to be advantageous. In this combination, there is usually the requirement to convert digital data into an analog manifestation of that data. It will be seen, too, that many devices in the control field are inherently analog in nature. Therefore, to use these devices with digital type apparatus, it is necessary to convert the digital data into analog form in order to control the analog devices. The present invention is primarily concerned with such a device.

Briefly, the present invention comprises a plurality of saturable magnetic cores, there being at least one such core for each digit position of the digital word or number which is to be converted. Each of these cores is furnished with an input winding, an output winding and a control winding. The input winding is connected to an alternating source of potential, and the control winding determines whether the output winding will produce a potential proportional to the turns ratio between the input and output windings or substantially no potential. The control winding is governed by the digital value of the digit position of the digital number to which it is connected. The turns ratios between the input and output windings for the cores of the different digit positions depends upon the radix used in the digital number and the digit positions to which the control windings are connected. To obtain the analog output voltage from the group of cores, the output windings thereof are combined in a manner to sum the potentials existing across each output winding. Provision is made for sign control over the output in that a positive digital number will produce an alternating output potential of a first phase and a negative digital number will produce an alternating output potential of a second phase, the second phase being 180° out of phase with the first phase. Provision is included in the circuit for assuring substantially constant loading on the alternating current input source. This arrangement includes an additional core for each core initially described, each additional core having an input winding, which is in series with the input winding on the core with which it is associated, and a control winding connected to the opposite side of the digit value manifesting device. Therefore, when a particular one of the cores initially described is saturated by the digit value manifesting device, the additional core associated with said one core will be unsaturated. Thus, the loading on the input source is kept substantially constant. Other embodiments are described in which the two cores described above for each digit position are combined to serve as a bistable device so as to be capable of being used directly to represent the value of the digit position and at the same time produce the proper output potential therefrom.

It is an object of this invention to furnish improved signal translating apparatus for producing an analog manifestation from a digital number.

Another object of the present invention is to provide a digital-to-analog conversion apparatus which may be composed completely of solid state devices.

Still another object of the invention is to produce a digital-to-analog conversion device in which the analog output is produced directly in alternating current form.

A further object of this invention is to furnish an improved digital-to-analog conversion apparatus utilizing saturable magnetic cores wherein the cores for a particular digit position may be used as bistable devices.

A still further object of this invention is to furnish a digital-to-analog conversion apparatus utilizing saturable magnetic cores for producing an alternating current analog output which is proportional to an alternating current input source as determined by a digital data input, there being means provided for producing substantially constant loading on the alternating current input source even though the analog output varies in amplitude.

Yet further, it is an object of this invention to produce an improved bistable device comprised of saturable magnetic cores.

Another object of the invention is to furnish an improved digital-to-analog converter which transforms a series of signals or potentials representing a digital number into an A. C. analog potential whose amplitude is a function of the digital number represented.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 2a shows the schematic details of one digit position of Fig. 1, and Fig. 2b illustrates the circuit of Fig. 2a in block form;

Fig. 3 is a chart illustrating the formation of the coding for the digits 1 through 9 in a two-out-of-five code;

Fig. 4 shows a schematic diagram of an adaptation of the first embodiment of the invention for use with a digital input in a two-out-of-five code;

Fig. 8 shows shows a schematic diagram of the second form of the invention for use with a conventional binary coded digital input;

Fig. 10 illustrates a transistor latch usable with the present invention for data input purposes;

Figs. 12a and 13a are schematic diagrams of And and

Figure 12A:
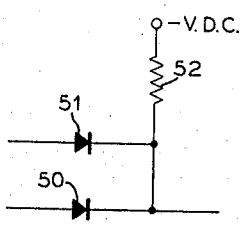
Figure 13A:
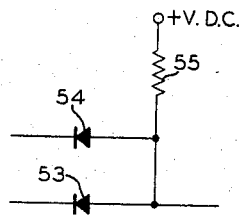
Figure 12B:
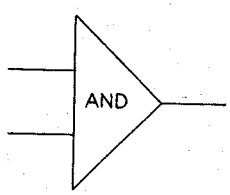
Figure 13B:
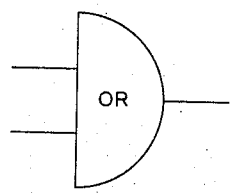
Figure 14:
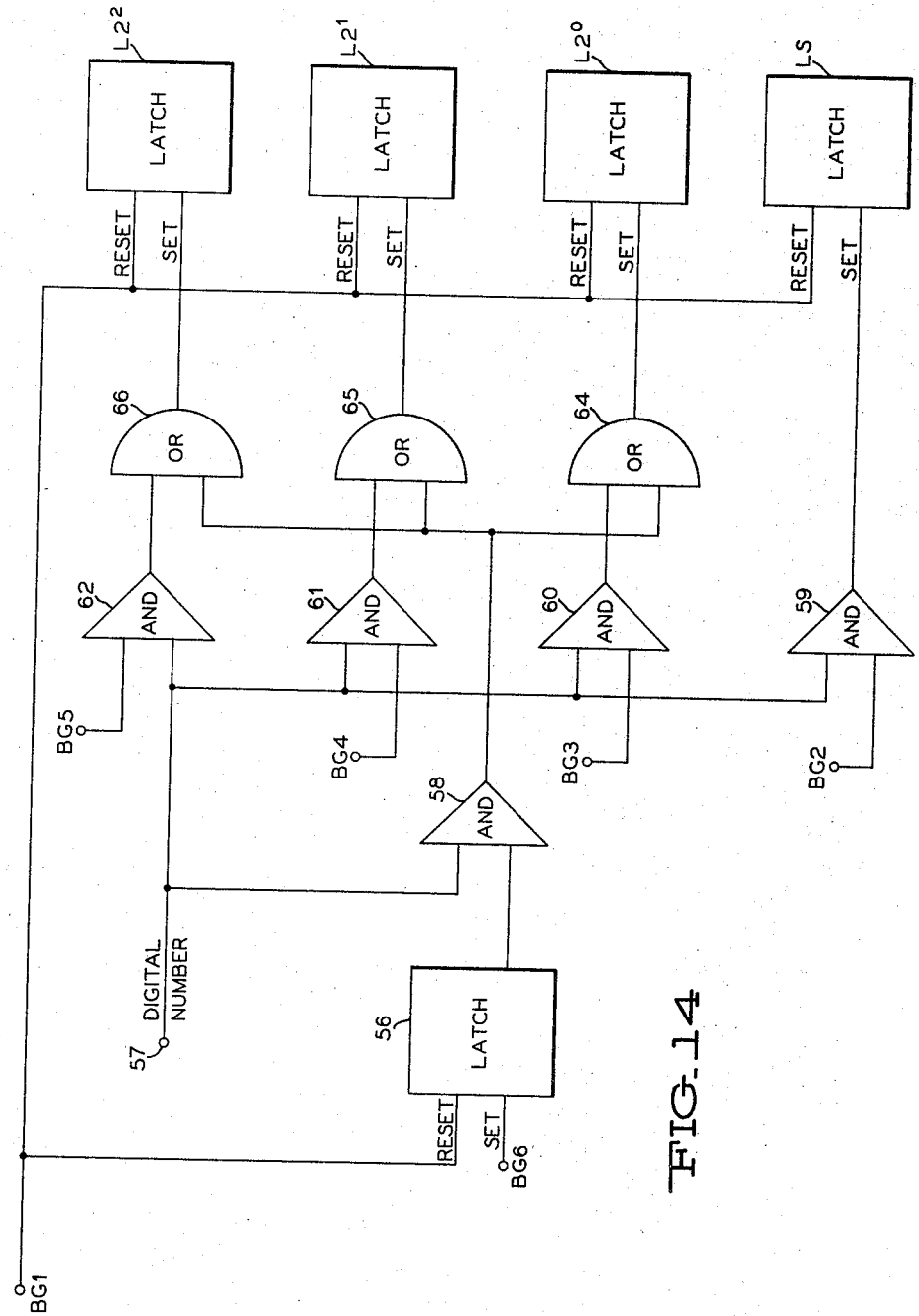

Or circuits, respectively, which appear in block form in Figs. 12b and 13b, respectively; and Fig. 14 is a schematic diagram of a suitable input circuit for the digital-to-analog conversion apparatus.

Computing devices are used to perform arithmetic operations on numbers. The numbers themselves are abstractions so that actually arithmetic operations are performed on representations of these abstractions or numbers. The term number, as used in this description, means an ordered set of digits considered as a unit, regardless of the meaning of the digits. Thus, a number may include a first group of digits which may be a coded representation of a particular number, a second group of digits representing an instruction, a third group representing an address, one or more sign digits, etc. The entire set of digits may be considered as a number and is synonymous with the term word While digital words or numbers may be manifested in many different ways, in most instances they appear in parallel on a predetermined number of lines in which each line has two possible conditions, or they appear serially on one line which has two possible conditions. These conditions may be the presence or absence of a signal at a particular time or merely different voltage levels wherein one of the levels is arbitrarily chosen to represent a "1" condition and the other level is chosen to represent a "0" condition. A "1" condition may be considered to be the presence of a signal and the "0" condition the absence of a signal. The number of input lines for parallel data depends upon the size or number of positions in the digital word being dealt with, there being one line for each digit position of the word Where the digital data is in serial fashion, one line is used and the number of positions in the digital data determines the transmission time. The apparatus ordinarily utilized in conjunction with each line in parallel data to "store" the digital value for any desired length of time is one having bistable characteristics. The present invention utilizes a latch such as that shown in Fig. 10 for this purpose.

Referring to Fig. 10, this latch basically comprises two transistors each connected as an inverter and two Or circuits. The Set input, for discussion purposes, is a negative pulse which is applied to one leg of Or circuit 10. As is well known, an Or circuit comprises two diodes whose plates are commoned and connected through a suitable resistor to a positive source of D. C. potential. The commoned plates are connected to the base electrode of an NPN type junction transistor 11 by a parallel RC network 12. Transistor 11 has its emitter electrode grounded and its collector electrode connected to a positive source of D. C. potential by way of a resistor 13 and a winding 14. This winding is adapted to serve as the control winding of a saturable magnetic core for determining which of the two states the core will be in. For example, if transistor 11 were conducting, a current would pass through winding 14 to saturate the core associated therewith, thereby placing the core in a "0" condition. The output from transistor 11 is taken from the collector electrode and fed to Or circuit 15, the other input to this Or circuit being the Reset pulse. The output from Or circuit 15 is supplied to the base electrode of an NPN junction type transistor 16 by way of a parallel RC network 17. The emitter electrode of transistor 16 is grounded and the collector electrode is connected to a positive source of D. C. potential through a resistor 18 and a winding 19. Winding 19 is adapted to be used as the control winding on a saturable magnetic core for determining which state the core will be held in.

The operation of the latch circuit illustrated in Fig. 10 is such that it has two stable states, one when transistor 11 is conducting and the other when transistor 16 is conducting. The latch is said to be Off or in its Reset condition when transistor 11 is conducting. This means that the collector electrode of transistor 11 will be at a voltage just above ground. The collector electrode voltage is supplied through Or circuit 15 to the base electrode of transistor 16, thereby keeping this transistor cut off. Under these circumstances, the collector electrode of transistor 16 will be at substantially +20 v. D. C. Since the Set input is normally at +10 v. D. C., it is a voltage slightly below this which is supplied to the base electrode of transistor 11 to keep it in a conducting condition. With the latch in the Off condition, the core associated with winding 14 will be saturated, i. e., in its "0" condition, and the core associated with winding 19 will be unsaturated, i. e., in its "1" condition.

When it is desired to turn the latch On, i. e., to Set the latch, a negative pulse is applied to the Set terminal. That is if the voltage at the Set terminal is dropped to approximately zero volts, the base electrode of transistor 11 will drop to a voltage slightly above zero and cut the transistor off. When this occurs, the collector electrode rises to +20 v. D. C. and unsaturates the core associated with winding 14. Since Or circuit 15 passes the lowest voltage supplied thereto, the normal +10 v. D. C. level of the Reset terminal causes transistor 16 to begin conducting, thereby saturating the core associated with winding 19. The collector electrode voltage drops to just above ground and passes through Or circuit 10 to keep transistor 11 cut off even though thereafter the Set terminal returns to +10 v. D. C.

To turn the latch Off, a Reset pulse is supplied through Or circuit 15 to cut off transistor 16. This causes an output from transistor 16 to place transistor 11 in a conducting condition.

Figure 1:
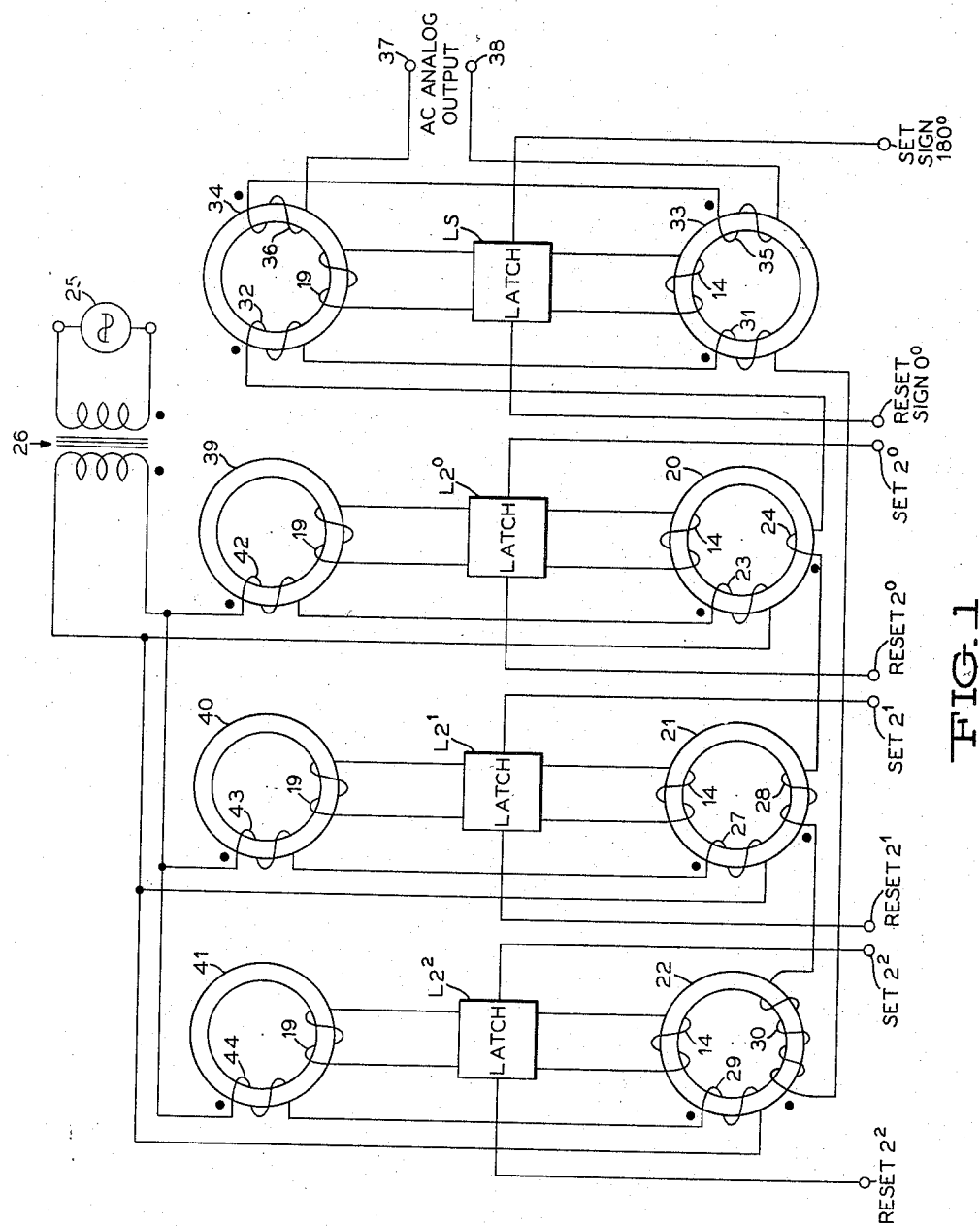
Fig. 1 is a schematic diagram of a first form of the invention for use with a conventional binary coded digital input.
Figure 11:
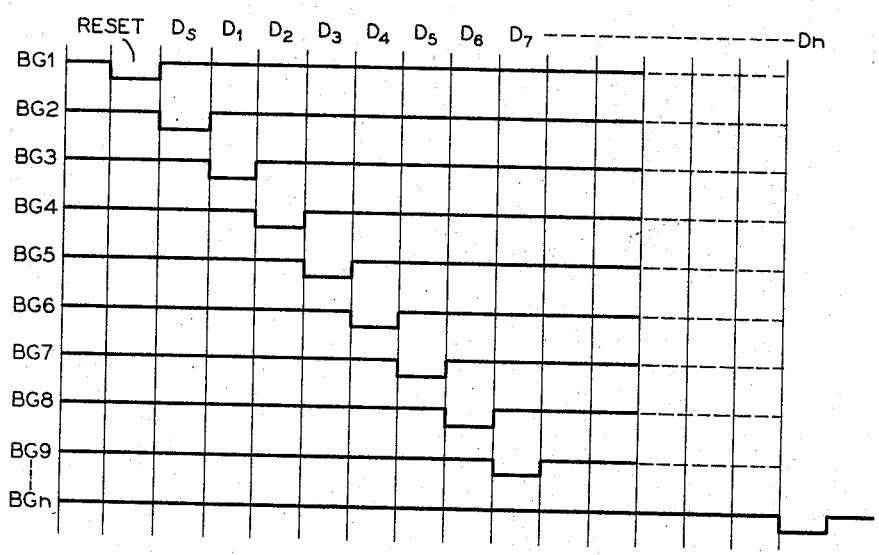
Fig. 11 is a timing diagram which shows the relationship between the bit gates BG*l*–BG*n* and the digits of a digital word.

The latch just described is utilized in each digit position of the first embodiment of the invention illustrated in Fig. 1. The first embodiment has been illustrated for use with a conventional binary code, i. e., one containing a plurality of digits according to the radix 2. The latches are shown in block form and provided with a reference letter L and a suffix which is the radix 2 and the particular coefficient for the digit position with which the latch is associated. Thus, the latches are $L2^0$, $L2^1$ and $L2^2$. The remaining latch LS is the sign latch, i. e., the one which determines whether the analog output voltage will be of 0° phase or 180° phase with respect to a reference voltage. It will be appreciated that the windings 14 and 19 which were illustrated in Fig. 10 are shown by the same reference numerals in Fig. 1. Also as in Fig. 10, each latch has Set and Reset inputs supplied thereto. As illustrated in Fig. 11, all latches are reset at BG1 time. Thereafter, the latches LS, $L2^0$, $L2^1$ and $L2^2$ are successively allowed to be set if the input data warrants that they be set. It should be understood that all of the latches could receive their Set inputs simultaneously if the digital input is presented in parallel.

As illustrated in Fig. 1, provision is made to receive a three digit binary coded input and a sign indication. Saturable magnetic cores 20, 21 and 22 are adapted to be associated with control windings 14 from latches $L2^0$, $L2^1$ and $L2^2$, respectively. Core 20 has input and output windings 23 and 24, respectively, associated therewith. The input winding 23 is connected to receive an A. C. voltage from a source 25 through a transformer 26. Source 25 produces a fixed amplitude A. C. voltage. Therefore, the output voltage from winding 24, providing core 20 is in its unsaturated condition, will be proportional to the turns ratio between windings 23 and 24. If core 20 is saturated, then there will be substantially no induced voltage in winding 24 from winding 23.

Core 21 has input and output windings 27 and 28, respectively, associated therewith while core 22 has input and output windings 29 and 30, respectively, associated therewith. Both of the input windings 27 and 29 are arranged to receive the A. C. voltage from source 25. As illustrated, all of input windings 23, 27 and 29 are arranged to receive their inputs in parallel.

The turns ratio between windings 27 and 28, for the particular code being dealt with, is one-half that for windings 23 and 24, while the turns ratio between windings 29 and 30 is one-quarter that for windings 23 and 24. It should be appreciated that the particular number of turns on the various windings associated with the cores are for illustration purposes only, the more important thing being the turns ratio relationships just described.

The output windings 24, 28 and 30 are connected in serial fashion with each other and in addition with the input windings 31 and 32 associated with the saturable magnetic cores 33 and 34, respectively. Cores 33 and 34 are furnished with serially arranged output windings 35 and 36, respectively, which are connected to output terminals 37 and 38. The input and output windings for the sign cores are arranged in such a fashion that the phase of the voltage at terminal 38 will be the same as that at the dot side of all the other windings in Fig. 1. The dots are provided to illustrate identical voltage phases. In the circuit shown, the A. C. analog output voltage at terminals 38 and 37 is said to be of 0° phase. That is, it is in phase with the input source at the dotted sides of the transformer 26. However, if the latch LS is turned On by a Set signal, the A. C. analog output voltage will be just 180° out of phase with that at the dotted sides.

The operation of the basic form of the invention just described will now be explained. Let us say that the binary input signal is 0000, wherein the first digit to the right represents the sign, the next digit the $2^0$ position, the next digit the $2^1$ position and the last digit the $2^2$ position. Since the $2^0$, $2^1$ and $2^2$ digit positions all have a value of zero, the A. C. analog output voltage from terminals 38 and 37 should be zero. At reset time, all of the Reset terminals will receive a reset signal. This causes the control windings associated with cores 20, 21, 22 and 33 to have a D. C. current flow therethrough to saturate the cores. Under these circumstances, the windings 24, 28 and 30 will have no voltages induced therein by windings 23, 27 and 29, respectively. Therefore, there will be no voltage applied to windings 31 or 32, respectively.

Now assume a digital input of 1010. After all of the cores are reset, latches $L2^0$ and $L2^2$ will be turned On in succession by inputs to the Set $2^0$ and Set $2^2$ terminals. This causes the windings 14 on cores 20 and 22 to have no current flow therethrough, and these cores will be unsaturated. This allows windings 23 and 29 to induce voltages in winding 24 and 30, respectively, which are proportional to the turns ratio in each case. Should there be one volt induced in winding 24, there would be four volts induced in winding 30. The sum of these voltages appears across windings 31 and 32, i. e., from the dotted side of winding 32 to the undotted side of winding 31. Since the input sign indication was for a 0° relationship with the source, core 33 will remain saturated. This causes winding 31 to have a very low impedance and allows the sum of five volts to appear across winding 32. This induces a voltage in winding 36 and produces an A. C. analog output voltage at terminals 38 and 37 of 0° phase, i. e., the potential at terminal 38 will be in phase with the dotted terminals on transformer 26. Had the digital input been 1011, core 34 would have been saturated and the five volts would have appeared across winding 31. This would have induced a voltage in winding 35 and produced an output at terminals 38 and 37 of 180° phase, i. e., the voltage at terminal 37 would be in phase with the dotted sides of the transformer 26.

From the above description, it will be apparent that A. C. analog voltages can be produced at terminals 37 and 38 of seven different amplitudes as well as zero amplitude. Of course, additional digit positions such as $2^3$ and $2^4$ could be provided for use with the $2^0$, $2^1$ and $2^2$ digit positions illustrated. It will also be appreciated that the three digits shown could be the three lowest significant digits of a digital input having many more positions. This could, for example, be the case where the output of this digital-to-analog converter represents the error signal in a closed loop servo system where there is always an effort to reduce the error signal to zero. It would be necessary however, to inspect the higher order positions, i. e., those above the $2^2$ digit position, to see if a "1" is in any of these higher order positions. If such a "1" did exist, it would then be desirable to set latches $L2^0$, $L2^1$ and $L2^2$ to produce the maximum analog output. As soon as the higher order digit or digits were reduced to zero by the feed-back servo action the lowest three significant digits could again take over.

The use of the three lowest significant digits and the sign digit of a large digital input may be better understood by reference to Figs. 11 and 14. Fig. 11 shows the timing for a $n$ position digital input in which bit gates BG1 through BG$n$ are utilized. As illustrated, the bit gates occur in succession. Fig. 14 shows a block diagram of the manner in which the latches LS, $L2^0$, $L2^1$ and $L2^2$ are individually set up by the sign digit and three lowest significant numerical digits, as well as how a "1" in any of the higher order digits can set up latches $L2^0$, $L2^1$ and $L2^2$ simultaneously. The logical And and Or circuits shown in Fig. 14 in block form will be briefly described before getting into a description of Fig. 14.

Fig. 12a shows a conventional negative And circuit. It comprises diodes 50 and 51 whose cathodes are commoned and connected to a negative source of D. C. potential through a resistor. The output from the commoned cathodes follows the most positive input. If negative pulses occur in coincidence, a negtive pulse will appear at the output. The block form of this circuit is illustrated in Fig. 12b.

Fig. 13a shows a conventional negative Or circuit. It comprises diodes 53 and 54 whose plates are commoned and connected to a positive source of D. C. potential by a resistor 55. The output from the commoned plates follows the most negative of the input pulses. Therefore, a negative pulse to the cathode of either of diodes 53 or 54 produces a negative output pulse. The block form of this Or circuit is shown in Fig. 13b.

Referring now to Fig. 14, latches LS, $L2^0$, $L2^1$ and $L2^2$ are all adapted to be reset by bit gate BG1. In addition a latch 56 is also reset by BG1. The digital error signal is presented at terminal 57 in serial fashion with the sign digit position appearing at BG2 time. The $2^0$ digit position input appears at BG3 time, the $2^1$ digit position at BG4 time, etc. The input to terminal 57 is connected to each of And circuits 58 through 62. Since latch 56 is in its reset condition up to BG6 time, the output therefrom to And circuit 58 will block the digital input from passing therethrough. For example, the input to And circuit 58 from the latch could be from the collector electrode of the transistor which is not conducting when the latch is in its reset condition.

The And circuits 59 through 62 are supplied with bit gates BG2 through BG5, respectively. Therefore, these And circuits are successively conditioned to allow the digital signals for these bit gate times to pass therethrough providing a "1" is supplied to terminal 57 at the particular bit gate times. For example, suppose that a ten digit input signal such as 0010100111 is fed to terminal 57, it being understood that the first digit to the right represents the sign. Under these circumstances, the sign indication "1" would occur in coincidence with BG2 at And circuit 59 and set latch LS. The next "1" occurs in coincidence with BG3 at And circuit 60 and sets latch $L2^0$ by way of Or circuit 64. The third digit from the right is a "1" and it occurs in coincidence with BG4 at And circuit 61 and sets latch $L2^1$ by way of Or circuit 65. The fourth digit from the right is a "0" and produces no output to Or circuit 66. Therefore, latch $L2^2$ is not set at this time.

If one inspects the above ten digit input, it is seen that it contains a "1" in the sixth and eighth digit positions from the right. This means that the error signal is larger than that indicated by the three lower order significant digit positions, i. e., the $2^0$, $2^1$ and $2^2$ digit positions. At BP6 time, latch 56 is set by bit gate BG6, thus supplying a substantially zero volt input to And circuit 58. It is seen that the digital input at terminal 57 is also connected to And circuit 58. Therefore, at BG7 time, the "1" in the sixth digit position from the right passes through And circuit 58 and Or circuits 64 through 66 to latches $L2^0$ through $L2^2$, respectively. Since latches $L2^0$ and $L2^1$ are already set, only $L2^2$ will be set by this input.

One problem does develop with the circuit described in Fig. 1. Since windings 23, 27 and 29 may offer either a high or low impedance to the A. C. source 25, there results uneven loading on the source. For example, with the digital input 1110, each of windings 23, 27 and 29 offer maximum impedance and with the digital input 0000 they offer minimum impedance. This extreme variation in loading on source 25 can reduce the accuracy of the circuit as well as do harm to various components when inputs such as 0110 or 1010 are being converted. To overcome this problem, additional cores 39, 40 and 41 are furnished for association with the control windings 19 of latches $L2^0$, $L2^1$ and $L2^2$, respectively. Cores 39, 40 and 41 are further provided with windings 42, 43 and 44, respectively, which are similar to windings 23, 27 and 29, respectively.

It will be remembered that in the basic latch circuit, windings 14 and 19 have a current flow therethrough alternately. Therefore, when core 20 is saturated by winding 14, core 39 will be unsaturated. On the other hand, when core 39 is saturated, core 20 will be unsaturated. Therefore, one of windings 23 or 42 will at any one time offer a low impedance to the source voltage and the other winding will offer a high impedance. Thus, for example, if core 20 is saturated and core 39 is unsaturated, substantially all of the input voltage will be developed across winding 42, since winding 23 offers a low impedance to current therethrough. With core 20 saturated and very little voltage across winding 23, substantially no part of this voltage will be induced in winding 24. This means that even though the digital input varies from 0000 to 1110, source 25 always is under substantially constant loading.

The first embodiment of the invention illustrated in Fig. 1 may be adapted to other codes in number systems having a different radix as well as to certain special codes. To show how these adaptations are possible, there is shown a single digit position in Fig. 2a which will hereinafter be illustrated in block form as shown in Fig. 2b. The latch L is the same as that illustrated in Fig. 10 and has similar windings 14 and 19 associated therewith. Winding 14 is wound on a core 45 which also has an input winding 46 and an output winding 47 thereon. Winding 46 is in series with a winding 48 on a core 49 with terminals A and B being connected to both windings. The Reset input to the latch L is to terminal C while the Set input is to terminal D. Output winding 47 is connected to terminals E and F. The terminals A, B, C, D, E and F are illustrated on the block shown in Fig. 2b.

Fig. 3 is a chart of a special code often referred to as a two-out-of-five code. The digit position values in this code for numerical purposes are 0, 1, 2, 3 and 6. Any of digits 1 through 9 may be represented by any two only of these positions. For example, the digit one is represented in code form as 00011. The digit five would be 01100 and the digit seven would be 10010. For the purposes of the present invention, the first position, i. e., the one having a value of zero, is not needed. That is, the analog voltage output is unaffected by the presence or absence of information in this first position. Therefore, to the digital-to-analog converter, the numerical portion of the input will be expressed in only the four higher order positions. Thus, the digit seven would appear as 1001. In order that a sign indication may be utilized, an additional position will be provided to the right of the lowest order position as in the Fig. 1 embodiment. Thus, the number +7 would appear in coded form as 10010 and the number —7 would appear as 10011.

Referring now to Fig. 4, there is illustrated a schematic diagram of the first embodiment of the invention which is adapted for use with the two-out-of-five coding illustrated in Fig. 3. The blocks labeled PV1, PV2, PV3 and PV6 are illustrated as in Fig. 2b for the circuitry shown in Fig. 2a. It will be appreciated that the only difference between these blocks from a structural standpoint is the turns ratio between the windings 46 and 47 illustrated in Fig. 2a. That is, the turns ratio in PV2 between these windings will be one-half that for the same windings in PV1. The turns ratio in PV3 between these windings will be one-third that between the same windings in PV1, and in PV6, the turns ratio between these windings will be one-sixth of the turns ratio between the same windings in PV1.

The terminals A and B are connected in each of PV1, PV2, PV3 and PV6 to opposite sides of the secondary of transformer 26. As in Fig. 1, this transformer is connected to a source of A. C. voltage 25. The Reset and Set inputs may be supplied in the same manner as in Fig. 1. That is, all Reset terminals C and the Reset Sign 0° may receive simultaneous inputs at BG1 time. At BG2 time, latch 67 associated with the Set Sign 180° may receive an input, providing the sign of the analog voltage output is to be of that phase. The Set 1, Set 2, Set 3 and Set 6 inputs may be supplied in coincidence with bit gates BG3, BG4, BG5 and BG6, respectively. For example, with a digital input 10011, latch 67 would be set by the "1" sign indication at BG2 time. Thereafter PV1 and PV6 would receive Set 1 and Set 6 inputs, respectively, in coincidence with bit gates BG3 and BG6. Therefore, if one volt is obtained across terminals E and F of PV1, six volts would be obtained across terminals E and F of PV6. This would produce a total of seven volts across winding 68 on core 69. This is due to the fact that core 70 will be saturated by the Set Sign 180° input to latch 67, causing winding 71 to be a very low impedance. Therefore, the A. C. analog output voltage will appear across winding 72 on core 69 to produce a voltage which is a function of the digital input 10011 at terminals 73 and 74. Since the sign is 180°, the potential at terminal 74 will be in phase with that at the dotted sides of transformer 26. With core 70 saturated, the output winding 75 is a low impedance and is in effect a short circuit path between terminal 73 and winding 72.

Figure 6:
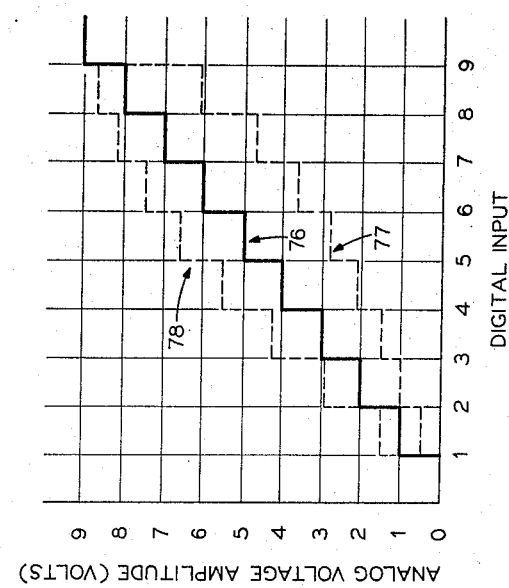
Fig. 6 illustrates a number of sample wave forms which may be obtained with a circuit shown in Fig. 5.

To this point in the description, the A. C. analog output has been a linear step function such as that shown in solid lines at 76 in Fig. 6. The different pedestal levels represent the amplitude of the A. C. analog voltage for a numeric type of digital input. However, in the use of the present invention in a servo loop arrangement, there is often the requirement for a nonlinear step function. For example, the step functions indicated in dotted lines and provided with reference numerals 77 and 78 may be desirable. Such step functions are easily obtainable in a coded decimal as well as other types of input. Parallel coded decimal digital inputs comprise ten lines, each of which may represent a "1" or a "0." For example, the coded decimal input for the digit eight would be 0100000000. The lowest order, zero, is at the right and the highest order, nine, is at the left. As before, the converter is not interested in the zero decimal digit position. Therefore, this position is eliminated and in its stead a sign position is provided. Thus, there are nine significant numerical digit positions and one sign position.

Figure 5:
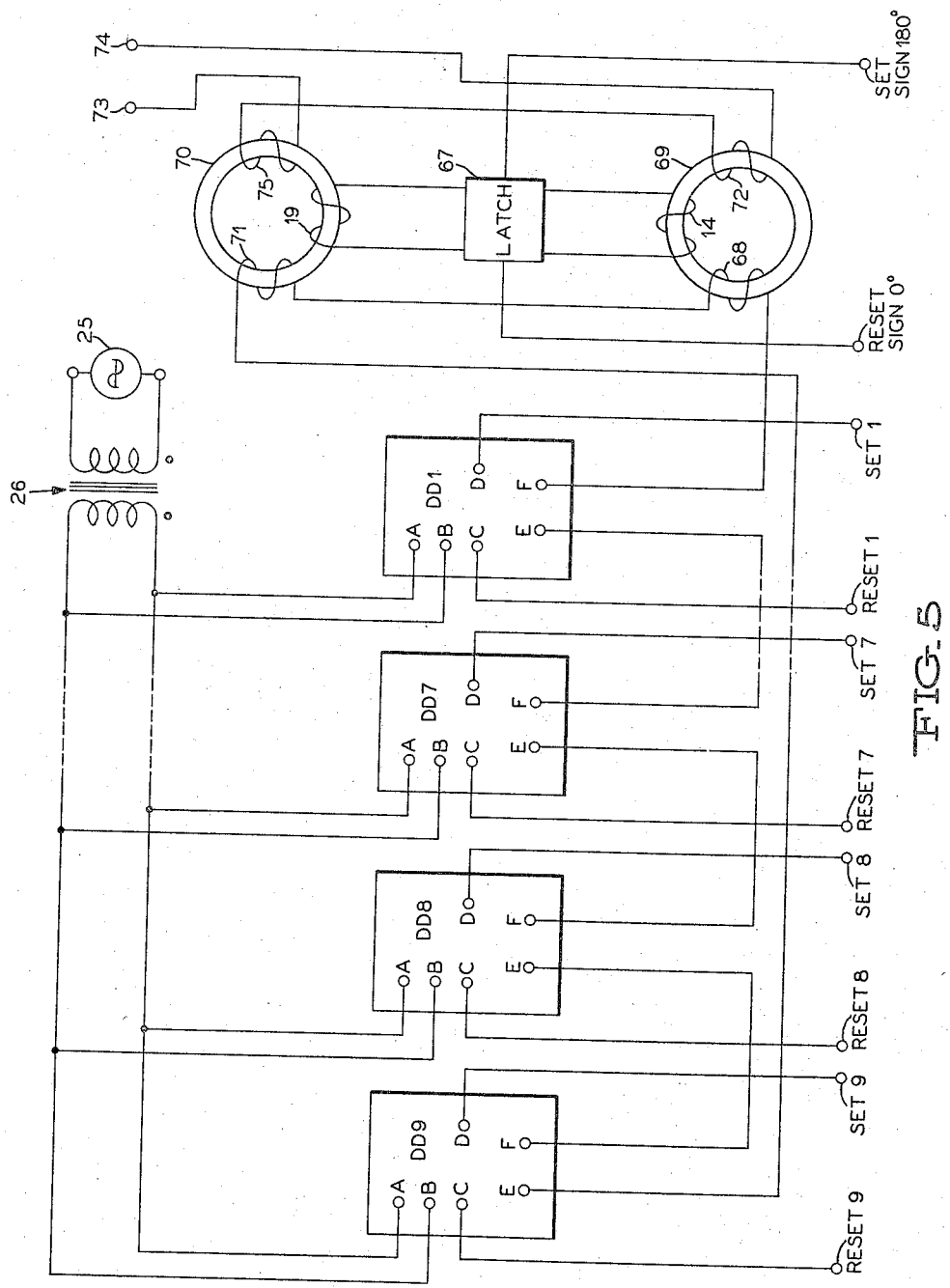
Fig. 5 shows a schematic diagram of the first embodiment of the invention for use with a digital input in a decimal code.

The adaptation of the first embodiment for operation with a coded decimal type of input is illustrated in Fig. 5. The blocks DD1 through DD9 may each include structure similar to that shown in Fig. 2a. For simplicity, only the blocks DD1, DD7, DD8 and DD9 are illustrated, but it will be understood that blocks DD2 through DD6 would be provided in the actual circuitry. The interconnection of the various blocks and their association with the A. C. source 25 as well as the Reset and Set input lines is believed obvious from prior descriptions. The sign control cores and associated windings are provided with the same reference numerals as those furnished for the same structure in Fig. 4.

In a coded decimal system such as that shown in Fig. 5, only one of the Set 1 through Set 9 lines will receive an input at any one word time. Therefore, in order to provide a step function such as that illustrated at 76 in Fig. 6, the ratio between windings 46 and 47 in block DD2 would be one-half the ratio between the same windings in DD1. The ratio between windings in DD3, DD4, DD5, DD6, DD7, DD8 and DD9 would be one-third, one-fourth, one-fifth, one-sixth, one-seventh, one-eight and one-ninth, respectively, of the turns ratio between windings 46 and 47 in DD1. Thus, in progressing from the decimal digit one to the decimal digit nine, the amplitude of the A. C. analog outputs from terminals 73 and 74 would progress upwardly in equal increments. For example, if one volt A. C. output is obtained for the decimal digit one, two volts A. C. would be obtained for the digit two, three volts A. C. for the digit three, etc.

To obtain the step function 77, it is necessary to change the ratio between windings 46 and 47 within each of the blocks in Fig. 5 to produce the desired A. C. output for particular decimal digits. For example, suppose that in producing the step function 76, a 1/1 ratio was used in block DD1 to produce one volt A. C. output for a decimal digit one input. To produce the step function 77, it may be desirable to use a 2/1 ratio in block DD1, thereby producing only one-half volt output. Block DD2 may have a 1/1 ratio to produce one volt A. C. output for a decimal digit two input. It will be seen that the ratios in blocks DD3 through DD9 will become increasingly smaller but not always in equal increments. For example, the ratio in DD8 may be approximately 1/6 while the ratio in DD9 may be 1/9. By changing the ratios in this nonlinear fashion it is possible to produce the nonlinear step functions such as 77 and 78 in Fig. 6.

Figures 7A, 7B:
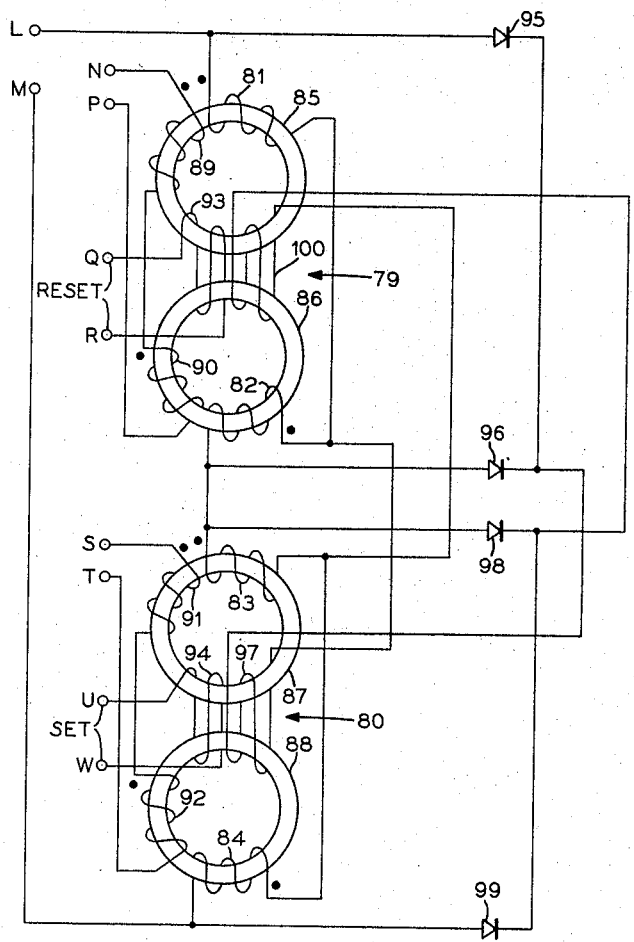
Fig. 7a shows the details of a single digit position of a second form of the invention.
Fig. 7b shows Fig. 7a in block form.

I have discovered that it is possible to eliminate the latches previously described by using the circuit shown in Fig. 7a in each digit position of a digital input. The circuit shown in Fig. 7a is basically a bistable device comprising two halves illustrated generally by reference numerals 79 and 80. Terminals L and M are interconnected by serially arranged input windings 81, 82, 83 and 84 on the saturable magnetic cores 85, 86, 87 and 88, respectively, and are adapted to be connected to a fixed amplitude source of A. C. potential. Serially arranged output windings 89 and 90 on cores 85 and 86, respectively, are connected to terminals N and P. Similarly, output windings 91 and 92 are furnished on cores 87 and 88, respectively, for association with terminals S and T.

That half of the circuit illustrated by reference numeral 79 has a winding 93 which encircles both of cores 85 and 86. Winding 93 is connected to terminals Q and R which are adapted to receive the Reset input. That half of the circuit illustrated by reference numeral 80 has a winding 94 thereon which encircles both of cores 87 and 88. Winding 94 is connected to terminals U and W which are adapted to receive the Set input.

In order to make the device bistable where only short pulse inputs are supplied, the potential across windings 81 and 82 is rectified by diodes 95 and 96, the cathodes thereof being commoned and connected to one side of a feed-back winding 97 which encircles both of cores 87 and 88. The other side of winding 97 is connected to a point intermediate windings 81 and 82. Similarly, the potential across windings 83 and 84 is rectified by diodes 98 and 99, the cathodes thereof being commoned and connected to one side of a feed-back winding 100 which encircles both of cores 85 and 86. The other side of winding 100 is connected to a point intermediate windings 83 and 84.

The operation of the circuit shown in Fig. 7a will now be explained. The circuit is considered to be Off when cores 85 and 86 are saturated. It is placed in this condition by a Reset input to terminals Q and R. With cores 85 and 86 saturated, windings 81 and 82 offer a low impedance to the A. C. source input at terminals L and M so that the source potential appears across windings 83 and 84. This produces a D. C. voltage at the commoned cathodes of diodes 88 and 99 which keeps cores 85 and 86 saturated by means of winding 100. To turn the device On, a Set input to terminals U and W saturates cores 87 and 88. When these cores are saturated, the windings 83 and 84 become low impedance paths and therefore no potential is developed thereacross to keep cores 85 and 86 saturated. This allows the A. C. supply voltage to transfer to windings 81 and 82 and transformer action to take place between windings 81 and 89 on core 85 and windings 82 and 90 on core 86. Therefore, an A. C. analog output is produced at terminals N and P which is the sum of the voltages developed across each of the windings 89 and 90. Cores 87 and 88 are kept saturated by the output of rectifiers 95 and 96 which is supplied to winding 97 on cores 87 and 88.

When several of the circuits shown in Fig. 7a are combined to form a digital-to-analog converter, the only thing which changes from one position to another is the ratio between windings 81 and 89 and 82 and 90. Windings 91 and 92 are used only in the sign control position and may be eliminated in the other positions. In illustrating this circuit in other views, it will appear in block form as shown in Fig. 7b.

Referring now to Fig. 8, there is illustrated a digital-to-analog conversion arrangement for coded binary data. This arrangement utilizes a plurality of the circuits shown in Fig. 7a. Each of these circuits is shown in block form as represented in Fig. 7b. The blocks 101, 102, 103 and 104 are labeled Sign, $PV2^0$, $PV2^1$ and $PV2^2$, respectively, the letters PV standing for position value. Terminals L and M in each of the blocks 102 through 104 are adapted to be connected to transformer 26 which receives a fixed amplitude A. C. voltage from source 25. Therefore, the A. C. input windings in the different blocks are in parallel. The ratio between the total number of turns in windings 81 and 82 and the total number of turns in windings 89 and 90 for block 103 will be one-half that for block 102 while the ratio between these windings in $PV2^2$ will be one-fourth that for block 102. All of the output windings 89 and 90 for blocks 102, 103 and 104 are serially connected. This is apparent when it is seen that terminal P in block 104 is connected to terminal N in block 103 and that terminal P in block 103 is connected to terminal N in block 102. The serially connected windings 81 through 84 in block 101 are in turn serially connected to the output windings 89 and 90 in the remaining blocks. This is accomplished by connecting terminal P in block 102 to terminal L in block 101, and by connecting terminal M in block 101 with terminal N in block 104. This means that the voltages developed across windings 89 and 90 in blocks 102 through 104 will be summed and appear across windings 81 and 82 or 83 and 84 in block 101. This voltage appears across windings 81 and 82 if the sign block 101 receives a Set Sign 180° signal. Otherwise, it appears across windings 83 and 84.

The circuit shown in Fig. 8 may be best understood by considering sample input data. For example, suppose the input is 1010. At bit gate BG1 time, all of the Reset lines receive inputs and blocks 101 through 104 are placed in their reset condition, i. e., all positions are turned Off. Since the first digit to the right is "0," the sign block 101 will remain in its reset condition. At BG3 and BG5 times, Set inputs are supplied to blocks 102 and 104, respectively. Therefore, if the turns ratio in block 102 is such that one volt A. C. appears across terminals N and P therein, four volts A. C. will appear across terminals N and P in block 104. Therefore, a total of five volts A. C. will appear across windings 83 and 84 in block 101. This produces an A. C. analog voltage proportional thereto at terminals P and T, the voltage at terminal P being in phase with the voltage at the dotted sides of transformer 26.

It will be appreciated that the embodiment of the invention shown in Fig. 8 can also be used with digital inputs having more than three significant digits plus a sign digit. It is but necessary to eliminate the latches LS, $L2^0$, $L2^1$ and $L2^2$ in Fig. 14 and substitute the stages Sign, $PV2^0$, $PV2^1$ and $PV2^2$, respectively, therefor. The Reset and Set inputs to these stages may be received from the same lines as those shown in Fig. 14.

It should also be apparent to persons skilled in the art that the basic circuit illustrated in Fig. 7a may be adapted to many other codes other than the conventional binary implementation shown in Fig. 8. For example, by adding one more stage and arranging the turns ratio in the various stages in the same manner as that described in connection with Fig. 4, it is possible to produce a system for operation with a two-out-of-five coded input. In fact, the present invention is suited for operation with many other types of digital code inputs such as the biquinary, decimal, three-out-of-six, binary coded decimal, etc. It is but necessary to provide one of the circuits such as that illustrated in Fig. 7a for each significant digit position in the code except that digit position having a zero value. The circuits would be combined in a manner such as that illustrated in Fig. 8, there being in addition a sign digit position as shown in Fig. 8. The turns ratio between windings 81 and 89 and 82 and 90 will vary from stage to stage in accordance with the position value, as has been illustrated in the adaptation of the invention to the different codings already described.

Figure 9:
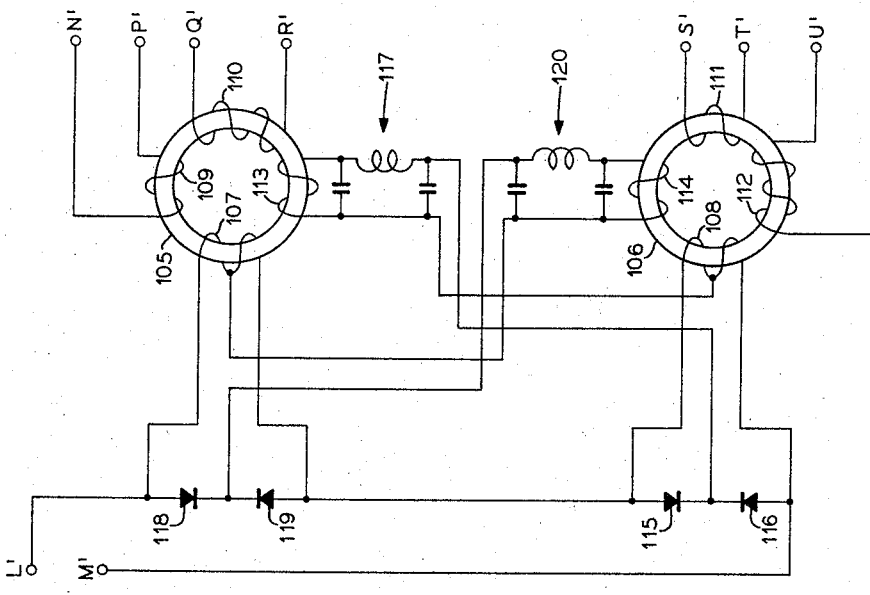
Fig. 9 shows the details of a single digit position of a third form of the invention, the block form of this circuit being identical with that illustrated in Fig. 7b.

Fig. 9 illustrates a bistable device using only two saturable magnetic cores. Several of these devices may be combined as illustrated in Fig. 8 to also produce a digital-to-analog conversion apparatus.

Referring to Fig. 9, there is provided cores 105 and 106 having A. C. input windings 107 and 108, respectively. These windings are serially arranged and connected to terminals L' and M'. An output winding 109 is provided on core 105 having output terminals N' and P'. Core 105 is also furnished with a Reset input winding 110 which is connected to terminals Q' and R'. Core 106 is furnished with an output winding 111, which is connected to terminals S' and T', and a Set input winding 112, which is connected to terminals U' and W'.

In order to make the circuit arrangement of Fig. 9 a bistable device where relatively short pulse inputs are furnished, additional windings 113 and 114 are provided on cores 105 and 106, respectively. The input to winding 113 is produced by providing diodes 115 and 116 having their cathodes commoned and their plates connected to opposite sides of winding 108. The winding 113 has one side connected to the commoned cathode and the side connected to a center tap on winding 108. A $\pi$ network 117 is provided in circuit with winding 113.

Winding 114 has one side connected to the commoned cathodes of diodes 118 and 119 and the other side connected to a center tap on winding 107, there being a $\pi$ network 120 in circuit with winding 114.

The operation of the device illustrated in Fig. 9 will now be explained. A Reset input to terminals Q' and R' saturates core 105. This allows the A. C. input potential from terminals L' and M' to be developed across winding 108, it being understood that winding 107 on the saturated core 105 is a very low impedance and has very little voltage developed thereacross. The A. C. potential across winding 108 is rectified by diodes 115 and 116 and supplied to one side of winding 113 on core 105, the return path being to the center tap of winding 108. The winding 113 serves to saturate core 105 and maintain it in saturation after the Reset input pulse ends.

To change the state of the device shown in Fig. 9, a Set input pulse is supplied to terminals U' and W' which saturates core 106. When this occurs very little potential appears across winding 108 and the bias control over winding 113 on core 105 is lost. This allows the A. C. input voltage to appear across winding 107 which maintains core 106 saturated through winding 114. At this time the device is said to be On, and a voltage is induced in the output winding 109. The amplitude of this induced voltage is a function of the turns ratio between windings 107 and 109.

The $\pi$ networks 117 and 120 serve to smooth the D. C. fluctuations from the rectifiers associated therewith. There is a further function which these networks accomplish which may best be understood by an example. With core 105 saturated, there is a time when the A. C. voltage at the commoned cathodes of diodes 115 and 116 is passing through zero. If $\pi$ network 117 were not used, there would be no input at this time to winding 113 to keep core 105 saturated. This could allow the A. C. input winding 107 to increase in impedance and build up a potential thereacross. This would produce a biasing potential on winding 114 which would attempt to saturate core 106. It will be readily appreciated that this is an undesirable action. However, with the $\pi$ network 117 provided, the D. C. voltage fluctuations from diodes 115 and 116 are smoothed. This tends to keep a saturating current through winding 113. In addition, the capacitors in the $\pi$ network 120 offer a low resistance path to any A. C. fluctuations which may appear between the commoned cathodes of diodes 118 and 119 and the center tap of winding 107, from reaching winding 114. The $\pi$ network 120 also prevents any induced transients from reaching winding 107 from winding 114.

The circuit shown in Fig. 9 may be utilized to produce a digital-to-analog conversion apparatus in a manner similar to that in which Fig. 7a was utilized. For example, if the blocks 101, 102, 103 and 104 in Fig. 8 had the terminals L, M, N, P, Q, R, S, T, U and W were changed to L', M', N', P', Q', R', S', T', U', and W', then Fig. 8 would be a proper representation of such a digital-to-analog conversion apparatus, it being understood that each of the blocks 101 through 104 has a circuit therein similar to that shown in Fig. 9. The only differences between the circuits in blocks 102 through 104 would be the turns ratio between the input winding 107 and the output winding 109. That is, if the ratio between these windings should be 1/1 in block 102, the ratio would be 1/2 in block 103 and 1/4 in block 104. Here again, the circuit of Fig. 9 may be used in arrangements for other digital coded inputs.

From the above-detailed description of this invention, it will be seen that I have provided a digital-to-analog conversion apparatus which is suitable for use with different types of digital signals, i. e., those in many different codes such as binary, decimal, binary coded decimal, biquinary, two-out-of-five, etc. A prime advantage in this invention is that the analog voltage is A. C. in nature. This contrasts with other digital-to-analog conversion apparatus where it is necessary to make the conversion to D. C. and thereafter into A. C. This invention possesses the further advantage that it may be extremely small and light in weight. This is important particularly where a large number of the devices are provided in an airborne computer.

While in the Fig. 7a embodiment of the invention, the windings 93 and 100, as well as 94 and 97, actually encircle both cores, it will be apparent that separate windings may be provided on each core. The important consideration is that the windings should be arranged so that the current therethrough will affect both cores in a similar manner.

Another important advantage of this invention is the fact that it may be composed completely of solid state devices. This affords reliability under varying environmental conditions such as changes in temperature, humidity and vibration. In addition to this, the invention has a very low power consumption.

While the digital inputs to the various converters have been described as being serially presented, it will be appreciated that these inputs could just as easily be in parallel.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Apparatus for converting digital words containing a plurality of digits into an A. C. analog voltage, said apparatus comprising core means for each of a selected number of said digits, input, output and control windings on said core means for each digit, means for supplying an A. C. voltage to said input windings, means connected to the control winding on each core means for conditioning said core means in a saturated or unsaturated state dependent upon the value of the input for the digit with which the core means is associated, the turns ratio between the input and output windings on each of said core means having an ordered relationship for producing a desired voltage at the output winding of each core means when said core means is unsaturated, and means for summing the voltages appearing across the output windings to produce said A. C. analog voltage.

2. In a system wherein digital numbers, containing a plurality of digits according to a predetermined radix, are represented by signals having one value for representing a digital value of 0 and another value for representing the digital value of 1, a plurality of saturable magnetic cores, there being at least one core for each digit position of said digital number, a control winding, an input winding and an output winding on at least one of the cores at each digit position, means for supplying an A. C. voltage to each of said input windings, means for supplying the signals for each digit position to the control winding associated with the core for that digit position for conditioning the core in accordance with the value of the digital input, and means for summing the voltages appearing across each of said output windings for producing an A. C. analog voltage which is a function of the digital number.

3. Apparatus for changing digital words containing a plurality of digits into an A. C. analog voltage, each digit position of a word having a predetermined position value, each digit having digital values of 1 and 0 which are represented by different input signal conditions, a plurality of bistable devices, there being one such device for each digit position, each of said bistable devices including saturable magnetic core means having an input winding, an output winding and a control winding thereon, means connected to said control winding which is responsive to the different input signal conditions for the digital values 1 and 0 for each digit for conditioning said bistable device to one of its stable states, means for supplying a fixed amplitude A. C. voltage to the input winding, the number of turns and the turns ratio between the input winding and the output winding for each position being a function of the digit position value, and means for summing the voltages appearing across the output windings on said core means for producing said A. C. analog voltage.

4. Apparatus for converting digital words containing a plurality of digits into an A. C. analog voltage, said apparatus comprising core means for each of a selected number of said digits, input, output and control windings on said core means for each digit, means for supplying an A. C. voltage to said input windings, means connected to the control winding on each core means for conditioning said core means in a saturated or unsaturated state dependent upon the value of the input for the digit with which the core means is associated, the turns ratio between the input and output windings on each of said core means having an ordered relationship for producing a desired voltage at the output winding of each core means when said core is unsaturated, means for summing the voltages appearing across the output windings to produce said A. C. analog voltage, and means responsive to one of the digits of a word other than said selected digits for determining the phase of said A. C. analog voltage.

5. Apparatus for converting digital words containing a plurality of digits into an A. C. analog voltage, said apparatus comprising core means for each of a selected number of said digits, input, output and control windings on said core means for each digit, means for supplying an A. C. voltage to said input windings, means connected to the control winding on each core means for conditioning said core means in a saturated or unsaturated state dependent upon the value of the input for the digit with which the core means is associated, the turns ratio between the input and output windings on each of said core means having an ordered relationship for producing a desired voltage at the output winding of each core means when said core is unsaturated, means for summing the voltages appearing across the output windings to produce said A. C. analog voltage, and means responsive to one of the digits of a word for determining the phase of said A. C. analog voltage, the last-named means comprising a bistable device having two halves, each half comprising core means, each of the last-named core means having input, output and control windings thereon, means connected to the last-named control windings for each half for saturating one or the other core means depending upon the digital value or the said one digit, and means for developing said A. C. analog voltage across the input winding of the unsaturated core means of said bistable device for producing an A. C. analog output from the output winding of the last-named unsaturated core means.

6. In a system wherein digital numbers, containing a plurality of digits according to a predetermined radix, are represented by signals having one value for representing a digital value of 0 and another value for representing the digital value of 1, a device having bistable characteristics for each digit position of a selected number of digit positions of said digital number; said device comprising first and second saturable magnetic cores, input windings on each of said cores which are serially connected to receive a source of A. C. voltage, a control winding on each core, means for supplying a voltage to one or the other of said control windings in response to a signal representing the digital value of the digit position with which the bistable device is associated, an output winding on one of said cores; and means connected to the output windings of the selected digit positions for manifesting an A. C. analog voltage which is a function of the sum of the A. C. voltages appearing across said output windings.

7. In a system wherein digital numbers, containing a plurality of digits according to a predetermined radix, are represented by signals having one value for representing a digital value of 0 and another value for representing the digital value of 1, a device having bistable characteristics for each digit position of a selected number of digit positions of said digital number; said device comprising first and second saturable magnetic cores, input windings on each of said cores which are serially connected to receive a source of A. C. voltage, a control winding on each core, means for supplying a voltage to one or the other of said control windings in response to the digital value of the digit position with which the bistable device is associated, an output winding on one of said cores; and means connected to said output windings which are responsive to the digital value of the sign digit position of said number for producing an A. C. analog voltage which is a function of said digital number.

8. In a system wherein digital numbers, containing a plurality of digits according to a predetermined radix, are represented by signals having one value for representing a digital value of 0 and another value for representing the digital value of 1, a device having bistable characteristics for each digit position of a selected number of digit positions of said digital number; said device comprising first and second saturable magnetic cores, input windings on each of said cores which are serially connected to receive a source of A. C. voltage, a control winding on each core, means for supplying a voltage to one or the other of said control windings in response to the digital value of the digit position with which the bistable device is associated, an output winding on one of said cores, the relationship between the input winding and the output winding on said one core being arranged to produce a predetermined voltage across said output winding when said one core is unsaturated, said predetermined voltage being determined by the value of the digit position with which the core is associated; and means connected to said output windings for manifesting an A. C. analog voltage which is a function of the sum of the A. C. voltages appearing across said output windings.

9. In a system wherein digital numbers, containing a plurality of digits according to a predetermined radix, are represented by signals having one value for representing a digital value of 0 and another value for representing the digital value of 1, a device having bistable characteristics for each digit position of a selected number of digit positions of said digital number; said device comprising first and second saturable magnetic cores, input windings on each of said cores which are serially connected to receive a source of A. C. voltage, a control winding on each core, means for supplying a voltage to one or the other of said control windings in response to the digital value of the digit position with which the bistable device is associated, an output winding on one of said cores, the relationship between the input winding and the output winding on said one core being arranged to produce a predetermined voltage across said output winding when said one core is unsaturated, said predetermined voltage being determined by the value of the digit position with which the core is associated; and means connected to said output windings which are responsive to the digital value of the sign digit position of said number for producing an A. C. analog voltage which is a function of said digital number.

10. Apparatus for changing digital words containing a plurality of digits into an A. C. analog voltage, each digit position of a word having a predetermined position value, each digit having digital values of 1 and 0 which are represented by different input signal conditions, a plurality of bistable devices, there being one such device for each digit position; each of said bistable devices having first and second windings associated therewith, there being current flow through said first winding when said bistable device is in one state and current flow through the other winding when said bistable device is in the other state; means connected to the bistable device of each position for conditioning said device in one or the other of its stable states in response to the digital value of that position; core means associated with each of said first and second windings, input windings on said core means and output windings on at least one of said core means, means for connecting each of said input windings to a source of A. C. voltage; and means connected to each of said output windings for obtaining an A. C. analog voltage which is a function of the digital word supplied to said bistable devices.

11. Apparatus for changing digital words containing a plurality of digits into an ac analog voltage, each digit position of a word having a predetermined position value, each digit having digital values of 1 and 0 which are represented by different input signal conditions, a plurality of bistable devices, there being one such device for each digit position; each of said bistable devices having first and second windings associated therewith, there being current flow through said first winding when said bistable device is in one state and current flow through the other winding when said bistable device is in the other state; means connected to the bistable device of each position for conditioning said device in one or the other of its stable states in response to the digital value of that position; core means associated with each of said first and second windings, an input winding on each of said core means, means for connecting the input windings on the core means of each position to a source of A. C. voltage, an output winding associated with one of the core means of each position, the effective induced voltage at an output winding from the input winding on said one core means when said one core means is unsaturated being a function of the value of the digit position with which it is associated, and means interconnecting the output windings of the different positions for obtaining an A. C. analog output voltage.

12. Apparatus for changing digital words containing a plurality of digits into an A. C. analog voltage, each digit position of a word having a predetermined position value, each digit having digital values of 1 and 0 which are represented by different input signal conditions, a plurality of bistable devices, there being one such device for each digit position; each of said bistable devices having first and second windings associated therewith, there being current flow through said first winding when said bistable device is in one state and current flow through the other winding when said bistable device is in the other state, means connected to the bistable device of each position for conditioning said device in one or the other of its stable states in response to the digital value of that position; core means associated with each of said first and second windings, an input winding on each of said core means, means for connecting the input windings on the core means of each position to a source of A. C. voltage, an output winding associated with one of the core means of each position, the effective induced voltage at an output winding from the input winding on said one core means when said one core means is unsaturated being a function of the value of the digit position with which it is associated, means interconnecting the output windings of the different positions for obtaining an A. C. analog voltage which is the algebraic sum of the voltages appearing across said output windings, and means responsive to the digital value of a sign digit in said word for receiving said A. C. analog voltage and determining the phase thereof.

13. In a system wherein digital numbers, containing a plurality of digits according to a predetermined radix, are represented by signals having one value for representing a digital value of 0 and another value for representing the digital value of 1, a device having bistable characteristics for each digit position of a selected number of digit positions of said digital number; said device comprising first and second saturable magnetic cores, input windings on each of said cores which are serially connected to receive a source of A. C. voltage, a control winding on each core, first rectifier means in circuit with the input winding on one core and the control winding on the other core, second rectifier means in circuit with the input winding on said other core and the control winding of said one core, said first rectifier means supplying a biasing voltage to the control winding on said other core when said one core is unsaturated and said second rectifier means supplying a biasing voltage to the control winding on said one core when said other core is unsaturated, means including windings on each of said cores which are responsive to input signals for saturating said one or said other core, and an output winding on one of said cores for producing an A. C. voltage when the core with which it is associated is unsaturated, said A. C. voltage being proportional to the digit position value with which it is associated; and means connecting the output windings of each of said bistable devices for summing the voltages appearing across said windings to produce said A. C. analog voltage.

14. A bistable device for use with digital signals having one value for representing a digital value of 0 and another value for representing the digital value of 1, said device comprising first and second saturable magnetic cores, input windings on each of said cores which are serially connected to receive a source of A. C. voltage, a control winding on each core, first rectifier means in circuit with the input winding on one core and the control winding on the other core, second rectifier means in circuit with the input winding on said other core and the control winding on said one core, said first rectifier means supplying a biasing voltage to the control winding on said other core when said one core is unsaturated and said second rectifier means supplying a biasing voltage to the control winding on said one core when said other core is unsaturated, and means including windings on each of said cores which are responsive to input signals for saturating one or the other of said cores.

15. A bistable device for use with digital signals having one value for representing a digital value of 0 and another value for representing the digital value of 1, said device comprising first and second saturable magnetic core means, input windings on each of said core means which are serially connected to receive a source of A. C. voltage, control windings on said core means, first rectifier means in circuit with the input windings on said first core means and a control winding on said second core means, second rectifier means in circuit with the input windings on said second core means and a control winding on said first core means, said rectifier means supplying biasing voltages to the control windings associated therewith when the core means with which the rectifier means is associated is unsaturated, and means including a winding on each of said core means responsive to input signals for saturating one or the other of said core means.

16. A bistable device for use with digital signals having one value for representing a digital value of 0 and another value for representing the digital value of 1, said device comprising first and second saturable magnetic cores, input windings on each of said cores which are serially connected to receive a source of A. C. voltage, a control winding on each core, first rectifier means in circuit with the input winding on one core and the control winding on the other core, second rectifier means in circuit with the input winding on said other core and the control winding on said one core, said first rectifier means supplying a biasing voltage to the control winding on said other core when said one core is unsaturated and said second rectifier means supplying a biasing voltage to the control winding on said one core when said other core is unsaturated, impedance means in circuit with each of said rectifier means for smoothing the fluctuations in the voltage output therefrom, and means including windings on said cores for saturating one or the other of said cores.

17. A bistable device for use with digital signals having one value for representing a digital value of 0 and another value for representing a digitial value of 1, said device comprising first and second pairs of saturable magnetic cores, an input winding linked with each core, all of the input windings being serially connected to each other and to a source of A. C. voltage, control winding means linkings each core of a pair of cores, first rectifier means in circuit with the input windings linked with said first pair of cores and the control winding means of said second pair of cores, second rectifier means in circuit with the input windings linked with said second pair of cores and the control winding means of said first pair of cores, said first and second rectifier means supplying biasing voltages to the control windings associated therewith when the pair of cores with which the rectifier means is associated is unsaturated, and winding means linked with each pair of cores responsive to input signals for saturating one or the other of said pair of cores.

18. Apparatus for converting digital words containing a plurality of digits into an A. C. analog voltage, said apparatus comprising core means for each of a selected number of the lower order digits of said word, input, output and control windings linked with the core means for each digit, means for supplying an A. C. voltage to said input windings, circuit means connected to the control winding on each core means for conditioning said core means in a saturated or unsaturated state dependent upon the value of the input for the digit with which the core means is associated, the turns ratio between the input and output windings on each of said core means having an ordered relationship for producing a desired voltage at the output winding of each core means when said core means is unsaturated, and means responsive to the occurrence of a word having a greater value than that which can be expressed by said selected digits for conditioning the core means associated with said selected digits in a manner to produce maximum voltages at the output windings linked with said core means, and means for summing the voltages appearing across the output windings to produce said A. C. analog voltage.

References Cited in the file of this patent
UNITED STATES PATENTS

| | | |
|---|---|---|
| 2,519,513 | Thompson | Aug. 22, 1950 |
| 2,652,501 | Wilson | Sept. 15, 1953 |
| 2,738,504 | Gray | Mar. 13, 1956 |

UNITED STATES PATENT OFFICE
CERTIFICATE OF CORRECTION

Patent No. 2,875,432                                                  February 24, 1959

George R. Markow

It is hereby certified that error appears in the printed specification of the above numbered patent requiring correction and that the said Letters Patent should read as corrected below.

Column 18, line 17, for "linkings" read -- linking --.

Signed and sealed this 16th day of June 1959.

(SEAL)
Attest:

KARL H. AXLINE                                                             ROBERT C. WATSON
Attesting Officer                                                          Commissioner of Patents